United States Patent [19]
Garney

[11] Patent Number: 5,319,751
[45] Date of Patent: Jun. 7, 1994

[54] DEVICE DRIVER CONFIGURATION IN A COMPUTER SYSTEM

[75] Inventor: John I. Garney, Aloha, Oreg.

[73] Assignee: Intel Corporation, Santa Clara, Calif.

[21] Appl. No.: 815,331

[22] Filed: Dec. 27, 1991

[51] Int. Cl.$^5$ .......................................... G06F 13/00
[52] U.S. Cl. ................................... 395/200; 395/275; 395/375
[58] Field of Search ............... 395/275, 375; 364/200; 371/11.1

[56] References Cited

U.S. PATENT DOCUMENTS

| | | | |
|---|---|---|---|
| 4,237,535 | 12/1980 | Wiedemann | 364/200 |
| 4,589,063 | 5/1986 | Shah et al. | 364/200 |
| 4,775,931 | 10/1988 | Dickie et al. | 364/200 |
| 4,837,680 | 6/1989 | Crockett et al. | 364/200 |
| 5,014,194 | 5/1991 | Itoh | 364/200 |
| 5,038,320 | 8/1991 | Heath et al. | 364/DIG. 2 |
| 5,136,709 | 8/1992 | Shirakabe et al. | 395/700 |
| 5,175,820 | 12/1992 | Gephardt | 395/275 |
| 5,214,761 | 5/1993 | Barrett et al. | 395/275 |

FOREIGN PATENT DOCUMENTS 0364115 4/1990 European Pat. Off. ...... G06F 9/445

OTHER PUBLICATIONS

Gibson, Steve, "Device driver 'stubs' smooth path to top SCSI performance". Infoworld, Nov. 19, 1990, abstract.

*Primary Examiner*—Dale M. Shaw
*Assistant Examiner*—Moustafa M. Meky
*Attorney, Agent, or Firm*—Blakely, Sokoloff, Taylor & Zafman

[57] ABSTRACT

A computer system for dynamically configuring device drivers of removable system resources. The computer system comprises a processor, a system memory and an interface for receiving removable system resources such as feature cards. Each feature card includes a card memory area comprising: 1) a full device driver portion, and 2) a stub device driver portion. Upon insertion of a card into the computer system, the device driver stub code image is read from the card memory area and transferred into an area of computer system memory. The device driver stub code is then executed by the processor of the computer system from computer system random access memory. Conversely, the full device driver code is not transferred to the computer system random access memory; rather, the full device driver is executed while still resident on the card. Upon execution, the device driver stub enables access to the full card resident device driver by allowing memory mapping to the full device driver. The full device driver may then be activated by the processor. Upon removal of a feature card from the computer system, the device driver stub disables access to the full card resident device driver by disallowing memory mapping to the full device driver.

17 Claims, 14 Drawing Sheets

FIGURE 4

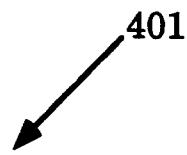

| | |
|---|---|
| Device Driver Information Block Identity Code | -403 |
| Link Data | -405 |
| Device Driver Stub Unique Identification | -407 |
| Device Driver Linkage Information | -411 |
| Device Driver Attribute Information | -413 |
| Device Driver Strategy Offset | -415 |
| Device Driver Interrupt Offset | -417 |
| Device Driver Units and Name | -419 |
| Device Driver Stub Code Offset | -421 |
| Device Driver Stub Code Length | -423 |
| Device Driver Stub Data Offset | -425 |
| Device Driver Stub Data Length | -427 |

DEVICE DRIVER INFORMATION
BLOCK (DDIB) HEADER

Device Driver Stub RAM Area

Stub Block

FIGURE 6c
Stub Header
-540-

| | |
|---|---|
| Device Driver Linkage Information | -630 |
| Device Driver Attribute Information | -632 |
| Device Driver Strategy Offset | -634 |
| Device Driver Interrupt Offset | -636 |
| Device Driver Units and Name | -638 |

FIGURE 6d
Stub Data
-542-

| | |
|---|---|
| Pointer to previous Stub Block | -660 |
| Pointer to next Stub Block | -662 |
| Adapter Identification | -664 |
| Socket Identification | -666 |
| Device Driver Stub Unique Identification | -668 |
| Card Insertion Flag | -672 |
| Driver Specific Data Area | -674 |

DEVICE DRIVER CONFIGURATION IN A COMPUTER SYSTEM

BACKGROUND OF THE INVENTION

1. Field of the Invention

The present invention pertains to the field of computer systems. Specifically, the present invention relates to computer systems supporting an interface for removable system resources and the control of device drivers related thereto.

2. Prior Art

It is becoming increasingly more important to design and build computer systems that can be dynamically configured without powering down the computer system or requiring the operating system program logic to be reset or bootstrap initialized. Dynamic configuration includes the ability to add or remove system resources or special feature capabilities while a computer system is operating. These system resources and special features include expansion memory boards, parallel or serial input/output (I/O) ports, read only memory (ROM) or flash memory expansion boards, computer network interface cards, modem cards, smart cards, or other removable system resources or special feature mechanisms.

Such removable system resources and special features are often implemented in the prior art using removable electronic feature cards adhering to the Personal Computer Memory Card International Association (PCMCIA), Sunnyvale, Calif., Release 2.0 standard. These PCMCIA feature cards generally comprise electronic microcircuits within a thin housing including a detachable multiple conductor interface with which the feature card may be removably inserted into a slot in a computer housing. Once inserted, a feature card is accessible to and used by the processor in the computer system. The use of feature cards allows a computer user to select specific features or resources from a variety of feature cards offered by a computer vendor. In this way, the computer user achieves the desired level of functionality without being required to purchase unnecessary resources or computer system capabilities. The overall cost of the computer system for a specific application is thereby optimized. The use of removable feature cards is particularly significant for portable computers or lap top computers where space constraints increase the need for system resource optimization. The design and use of hardware devices under the PCMCIA standard are well known in the art. It will be apparent to those skilled in the art that other implementations of removable system resources are possible.

Virtually all computer systems operate with some sort of operating system or software processing logic. The use of an operating system in a computer system is well-known in the art. The operating system is responsible for managing the processing and transfer of information between various system resources. One well known technique for managing these resources is the use of device drivers. Device drivers are software modules comprising processing logic for controlling the low level or device specific components of a particular computer system resource. For example, a device driver may be used for controlling a magnetic disk drive device coupled to a computer system. In this example, the device driver would control the various hardware specific registers, latches, signals, or other components of the magnetic disk drive device. Similarly, other computer system resources such as serial or parallel input/output (I/O) ports, modem devices, computer network interface devices, or memory expansion boards are controlled by device drivers.

In conventional computer systems, device drivers are typically loaded into random access memory (RAM) during bootstrap initialization of the computer system. Many prior art computer systems require that device drivers be loaded at initialization time in order for random access memory to be allocated properly. Depending upon the complexity of the device controlled by the device driver, the device driver itself may be relatively small or a very large device driver that consumes many thousands of bytes of random access memory. Thus, many prior art systems require that a full system configuration of resources be installed and available at bootstrap initialization time. If system resources or interfaces are subsequently added or removed from the system, the inability to access a newly installed resource or the errant access to a now unavailable system resource usually results. Other prior art computer systems require that the computer system be powered down while new system resources or features are added or removed from the system. Still other systems must at least be newly bootstrap loaded in order to gain access to a new configuration of system resources. Thus, prior art computer systems cannot be readily reconfigured to a new arrangement of system resources.

Because prior art systems typically require that a full system configuration of resources be established at initialization time, the tendency exists for any or all system resources that may conceivably be used while a computer system is powered up to be installed during the initialization process. This tendency leads to the installation of resources that are never used during a computing session. The loading and installation of unused system resources increases the time required for bootstrap initializing the system and reduces the available random access memory (RAM), because of the RAM space required by unused device drivers. It is, therefore, important to install in a computer system only those device drivers actually needed during a computing session. In some cases, it may not be possible to load all of the device drivers necessary because of the random access memory storage constraints.

Some computer systems in the prior art provide means for interfacing with removable electronic feature cards. In order to mitigate the disadvantages described above, some of these computer systems store associated device drivers on the removable electronic feature card itself. In this way, random access memory space within the computer system does not need to be allocated for storage of the device driver. Moreover, processing time during initialization is not consumed by having to load the device driver into random access memory. Systems that configure device drivers on the removable feature cards have the advantage of optimizing memory allocation requirements within the computer system.

Systems that configure device drivers on removable feature cards, however, have several important disadvantages. First, if a feature card is removed from the computer system, the device driver controlling the operation of the feature card becomes inaccessible to the computer system. In most cases, the computer system requires access to a device driver in order to properly terminate the operation of the device prior to removal of the feature card. Typically, the computer system does not have sufficient time to access the device driver prior to removal of the feature card. Thus, system errors often result from an improperly terminated system resource.

Other computer systems having means for interfacing with removable electronic feature cards, provide a very limited capability for responding to insertion or removal of feature cards during post initialization operation of the computer system. Some computer systems do not recognize system resources connected to the computer system after the bootstrap initialization process has been completed. Other computer systems suspend or freeze the operation of the computer system if a system resource is removed after initialization is complete. Still other computer systems require that the system be powered down or the bootstrap initialization process be reinitiated if a new configuration of system resources is desired.

Thus, a better means for dynamically configuring system resources in a computer system is needed.

SUMMARY OF THE INVENTION

The present invention is a computer system having dynamic device driver configuration for removable system resources. The computer system comprises a processor, a system memory and an interface for receiving removable system resources. These system resources and special features include expansion memory boards, parallel or serial input/output (I/O) ports, read only memory (ROM) or flash memory expansion boards, computer network interface cards, modem cards, smart cards, or other removable system resources or special feature mechanisms (generally denoted feature cards or cards).

A feature card includes a card memory area. The card memory area includes software for controlling the remaining card specific functionality. This software within the card memory area, including both data and processing logic, includes a device driver for controlling the feature card.

In order to avoid the problems encountered in the prior art, the feature card device driver of the present invention is separated into two parts: 1) a full device driver portion, and 2) a stub device driver portion. The full device driver provides all of the device driver functionality necessary to control each and every function of the feature card. The device driver stub is a small compact portion of processing logic associated with the full device driver, but mainly responsible for linking the full device driver with operating system software located in the computer system.

The card memory area comprises a device driver information block (DDIB) header, a device driver stub code image, and full device driver code. The device driver information block header comprises information used for linking the device driver with other device drivers and computer system processing logic. The device driver stub code image comprises a compact portion of processing logic and data that is copied into computer system memory upon insertion of a feature card into the computer system. The full device driver code remains card resident.

Upon insertion of a card into the computer system, the device driver stub code image is read from the card memory area and transferred into an area of computer system memory. The device driver stub code is then executed by the processor of the computer system from computer system random access memory. Conversely, the full device driver code is not transferred to the computer system random access memory; rather, the full device driver is executed while still resident on the card. Upon execution, the device driver stub enables access to the full card resident device driver and allows memory mapping to the full device driver. The full device driver may then be activated by the processor.

The DDIB header comprises a set of information for linking the card device driver in a linked list with other device drivers and with the operating system logic executing within the computer system. By traversing the linked list, a particular device driver may be located. Upon insertion of a card, the linked list of device drivers is traversed to determine whether the device driver stub already resides in said computer system memory. If so, the operation of copying the device driver stub into computer system memory is prevented from occurring. As a card is inserted, a card insertion flag is set to indicate the removable system resource is coupled to the computer system.

When a card is removed from the computer system, the linked list of device driver stubs is traversed to find all device driver stubs associated with the removed card. Each associated device driver stub is executed. The device driver stub disables access to the removed card by disallowing memory mapping to the removed card. The device driver stub is unlinked from the linked list of device driver stubs and the card insertion flag is reset to indicate that the removable system resource has been decoupled from the computer system.

It is, therefore, an object of the present invention to provide a computer system in which system resources may be added or removed prior to or following bootstrap initialization of the computer system. It is a further object of the present invention to provide a computer system wherein system resources may be reconfigured without powering down the computer system. It is a further object of the present invention to provide a computer system wherein system resources may be reconfigured without reinitiating the bootstrap initialization process. It is a further object of the present invention to provide a computer system wherein unused system resource device drivers do not need to be loaded into the random access memory of the computer system. It is a further object of the present invention to provide a computer system wherein the full system configuration may not necessarily be known at bootstrap initialization time. It is a further object of the present invention to provide a computer system having an interface for receiving removable electronic feature cards that may be inserted or removed at any time during operation of the computer system.

These and other objects of the present invention will become apparent as presented and described in the following description of the preferred embodiment.

BRIEF DESCRIPTION OF THE DRAWINGS

FIG. 4 illustrates the content of the Device Driver Information Block Header.

FIG. 6c illustrates the content of a stub header.

FIG. 6d illustrates the content of the stub data area.

DETAILED DESCRIPTION OF THE PREFERRED EMBODIMENT

The present invention is a computer system having a method and means for dynamically configuring device drivers of removable system resources. In the following description, numerous specific details are set forth in order to provide a thorough understanding of the present invention. However, it will be apparent to one of ordinary skill in the art that these specific details need not be used to practice the present invention. In other circumstances, well known structures, circuits, and interfaces have not been shown in detail in order not to obscure unnecessarily the present invention.

Figure 1:
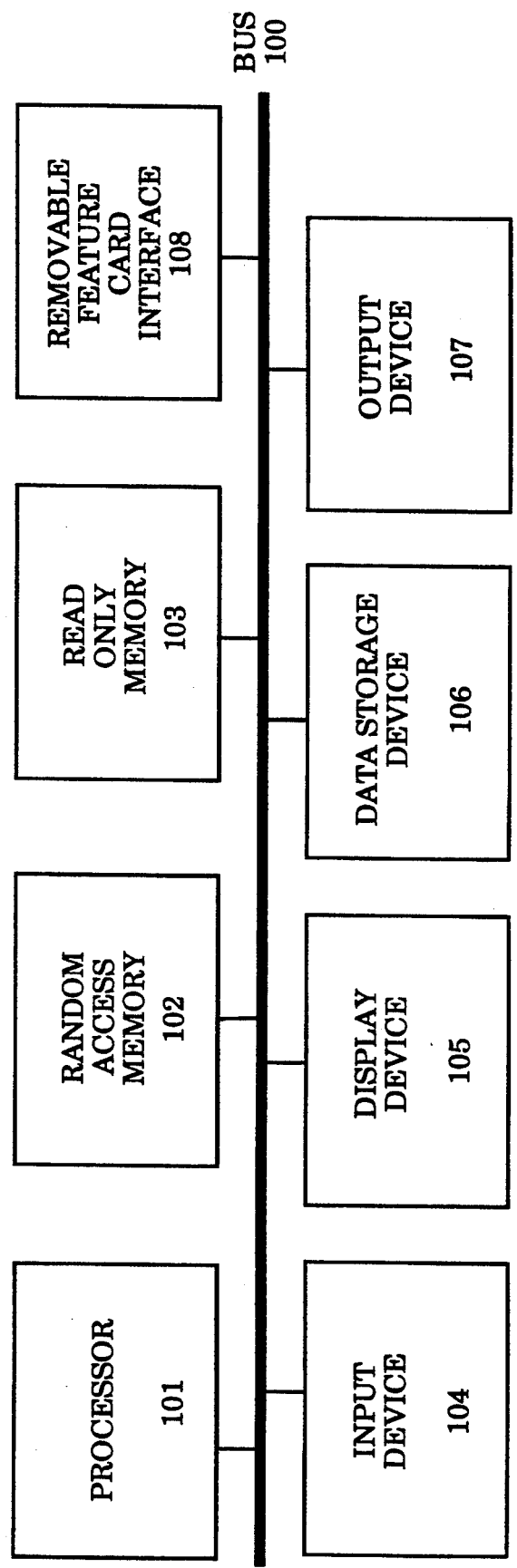
FIG. 1 is a block diagram of the architecture of a computer system in which the present invention operates.

Referring now to FIG. 1, a block diagram of the computer system in which the present invention operates is illustrated. It will be apparent to those of ordinary skill in the art, however, that alternative computer system architectures may be employed. In general, such computer systems as illustrated by FIG. 1 comprise a bus 100 for communicating information, a processor 101 coupled with the bus 100 for processing information, and a random access memory device 102 coupled with the bus 100 for storing information and instructions for processor 101. The processing logic of the present invention is typically stored in a device such as random access memory 102 and executed therefrom by processor 101. In addition, a typical computer system may optionally include other system resources including a read only memory device 103 coupled with the bus 100, an input device 104 such as an alphanumeric input device or a cursor control device coupled to the bus 100 for communicating information and command selections to the processor 101, a display device 105 such as a video display terminal or a liquid crystal display device coupled to the bus 100 for displaying information to a computer user, a data storage device 106 such as a magnetic disk and disk drive coupled with the bus 100 for storing information and instructions, an output device 107 such as a printer or facsimile apparatus coupled to the bus 100 for communicating information to a destination external to the computer system, and a removable electronic feature card interface 108 for electrically removably coupling an electronic circuit card to bus 100.

Removable feature cards which may be removably inserted into interface 108 generally comprise electronic microcircuits within a thin housing including a detachable multiple connector interface with which the feature card may be removably inserted into a slot in a computer system housing. In the preferred embodiment, the feature cards and feature card interface 108 used with the present invention adhere to the PCMCIA release 2.0 standard for electronic feature cards. Feature cards of this form are well known to those of ordinary skill in the art.

Figure 2:
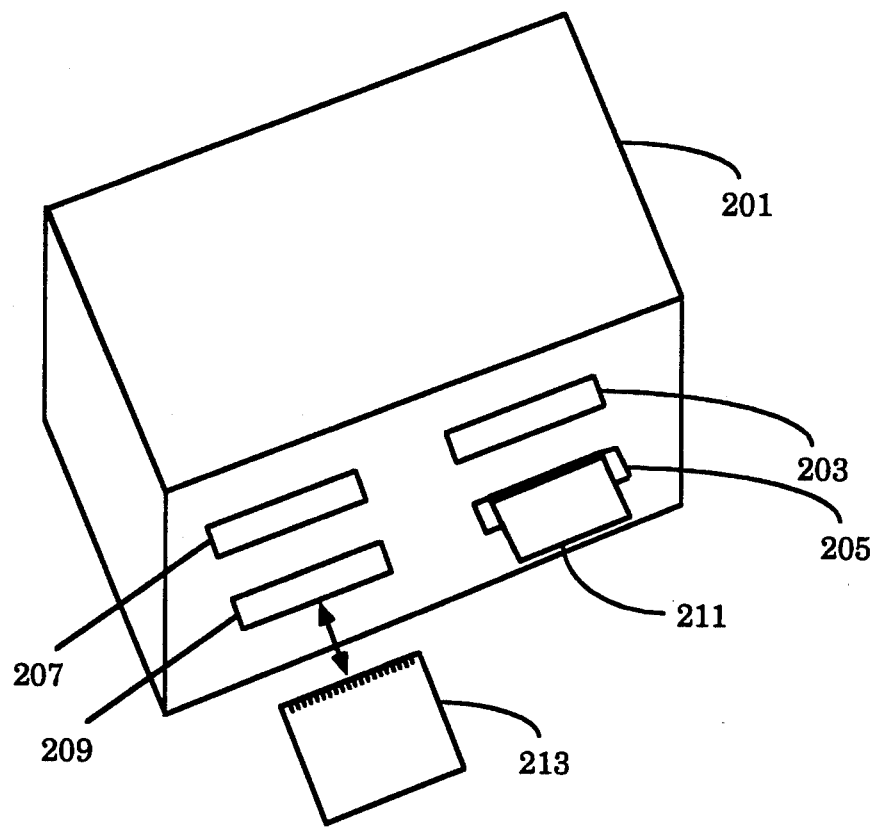
FIG. 2 is an example of a computer housing containing a plurality of feature card insertion slots.

Referring now to FIG. 2, an illustration of a computer system housing having a plurality of feature card interfaces (203, 205, 207, and 209) is illustrated. As shown, feature cards 211 and 213 may be removably inserted and thereby electrically coupled to an interface 108 within the computer system. This feature card structure facilitates the convenient insertion and/or removal of feature cards during the course of a computing session.

Figure 3:
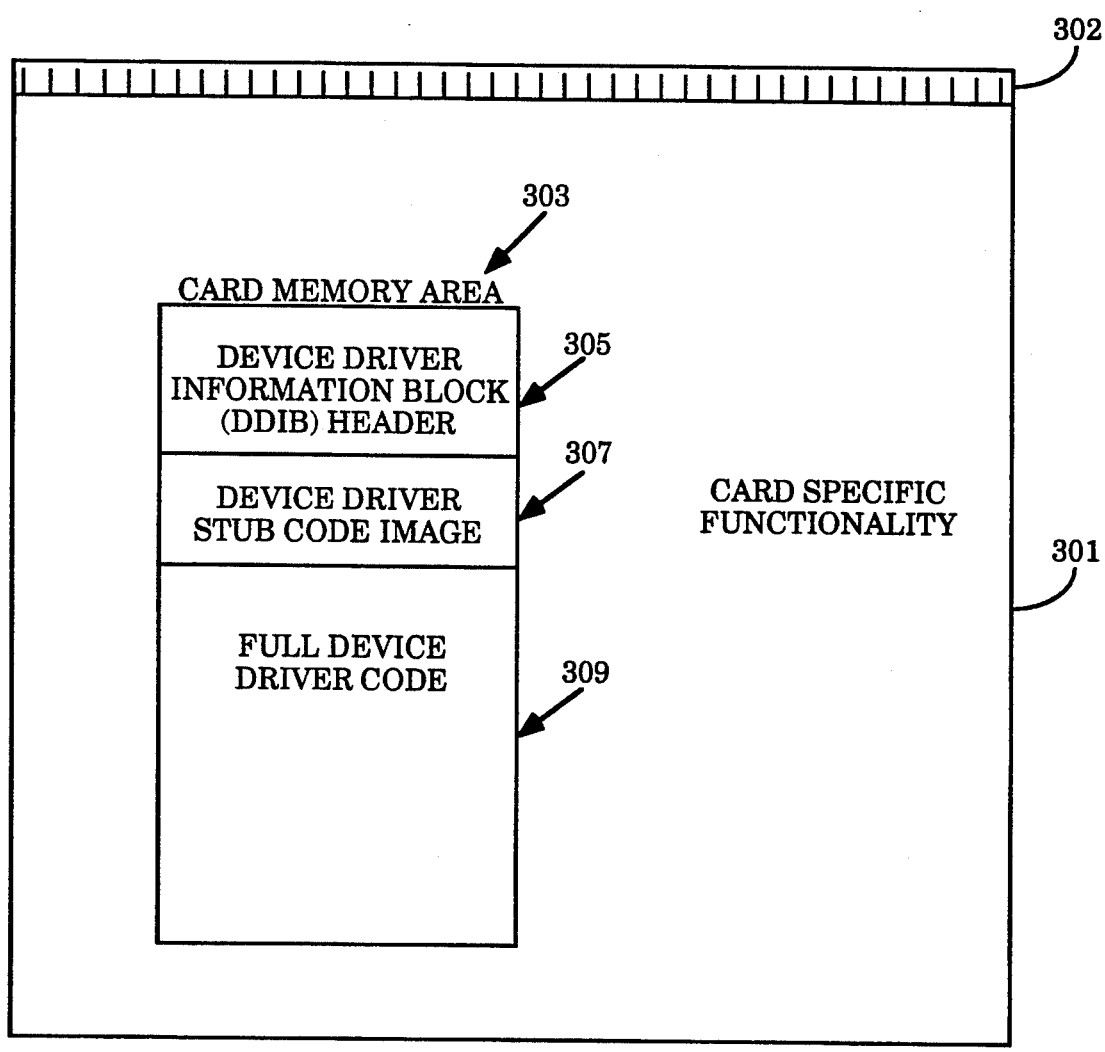
FIG. 3 is a block diagram of the contents of a removable electronic feature card.

Referring now to FIG. 3, the structure of a typical feature card 301 is illustrated. Feature card 301 includes an interface 302 with which the feature card 301 may be removably electrically coupled to a computer system. Feature card 301 also includes a card memory area 303. Card memory area 303 includes software for controlling the remaining card specific functionality. This software within card memory area 303, including both data and processing logic, includes a device driver for controlling the operation of the feature card.

As described above, it is convenient to store the device driver for a feature card on the feature card itself. Using this technique, RAM space within the computer system does not need to be provided for the card device driver and processing time is not consumed in transferring a device driver from the card to computer system RAM. Maintaining the card device driver on the card itself also achieves the advantage of assuring that the device driver is always compatible with the card specific functionality. There is less chance for a mismatch between the device driver stored in the computer system and the card specific functionality provided on the card.

In order to avoid the problems encountered in the prior art, the feature card device driver of the present invention is separated into two parts: 1) a full device driver portion, and 2) a stub device driver portion. The full device driver provides all of the device driver functionality necessary to control each and every function of the feature card. The device driver stub is a small compact portion of processing logic associated with the full device driver, but mainly responsible for linking the card resident full device driver to operating system software located in the computer system. The device driver stub is copied into and executed from computer system random access memory. Conversely, the full device driver remains resident on the feature card and is executed therefrom. Because the device driver stub for each feature card is a compact processing logic block, many such device driver stubs for different feature cards may be stored in computer system random access memory without consuming excessive amounts of computer system RAM. This configuration allows a large number of device driver stubs to be resident in computer system memory without having to allocate computer system RAM for the full device driver for each feature card.

Referring again to FIG. 3, card memory area 303 comprises device driver information block (DDIB) header 305, device driver stub code image 307, and full device driver code 309. Device driver information block header 305, comprises information used for linking the device driver with computer system processing logic. The content and structure of device driver information block header 305 is illustrated in FIG. 4 and described below. Card memory area 303 also comprises the device driver stub code image 307 which is copied to computer system memory and the full device driver code 309 which remains card resident.

Upon insertion of card 301 into the computer system, the device driver stub code image 307 is read from card memory area 303 and transferred into an area of computer system memory 102. The device driver stub code is then executed by the processor of the computer system from computer system random access memory. Conversely, full device driver code 309 is not transferred to the computer system random access memory 102; rather, the full device driver is executed while still resident on card 301. Upon execution, the device driver stub enables access to the full card resident device driver 309 and allows memory mapping to the full device driver 309. The full device driver 309 may then be activated by the processor 101.

Referring now to FIG. 4, the content and structure of the device driver information block (DDIB) header is illustrated. DDIB header comprises a set of information for linking the card device driver with operating system logic executing within the computer system.

DDIB header comprises a device driver information block identity code 403 that identifies the remaining information as being part of a DDIB header. Link data field 405 is used for linking the DDIB with other DDIBs (not shown) in the card memory area 303. Device driver stub unique identification 407 is a unique value that identifies the device driver stub and distinguishes the device driver stub from all other device driver stubs.

The next five DDIB header fields (i.e. fields 411, 413, 415, 417, and 419) are all the same values contained within a standard operating system device driver header. Specifically, these five parameters are contained within the DOS (Disk Operating System developed by Microsoft, Corp., Redmond, Wash.) device driver header which is well known to those of ordinary skill in the art. Device driver linkage information 411, device driver attribute information 413, and device driver units and name 419 comprise device driver identification and linking information used by the operating system to identify and link with the corresponding device driver. The device driver strategy offset 415 and device driver interrupt offset 417 contain the offset from the beginning of the device driver stub code area. These fields are modified by the operation of the present invention as will be described below. Device driver stub code offset 421 and device driver stub code length 423 provide a means by which the computer system processing logic may determine where and how large the device driver stub code segment is as resident on the feature card. Similarly, device driver stub data offset 425 and device driver stub data length 427 provide a means for determining where and how large the device driver stub data area is on the feature card. Knowing the location and size of the code and data areas for the device driver stub, operating system logic within the computer system may transfer the device driver stub code and data areas from the feature card into computer system random access memory.

Figure 5:
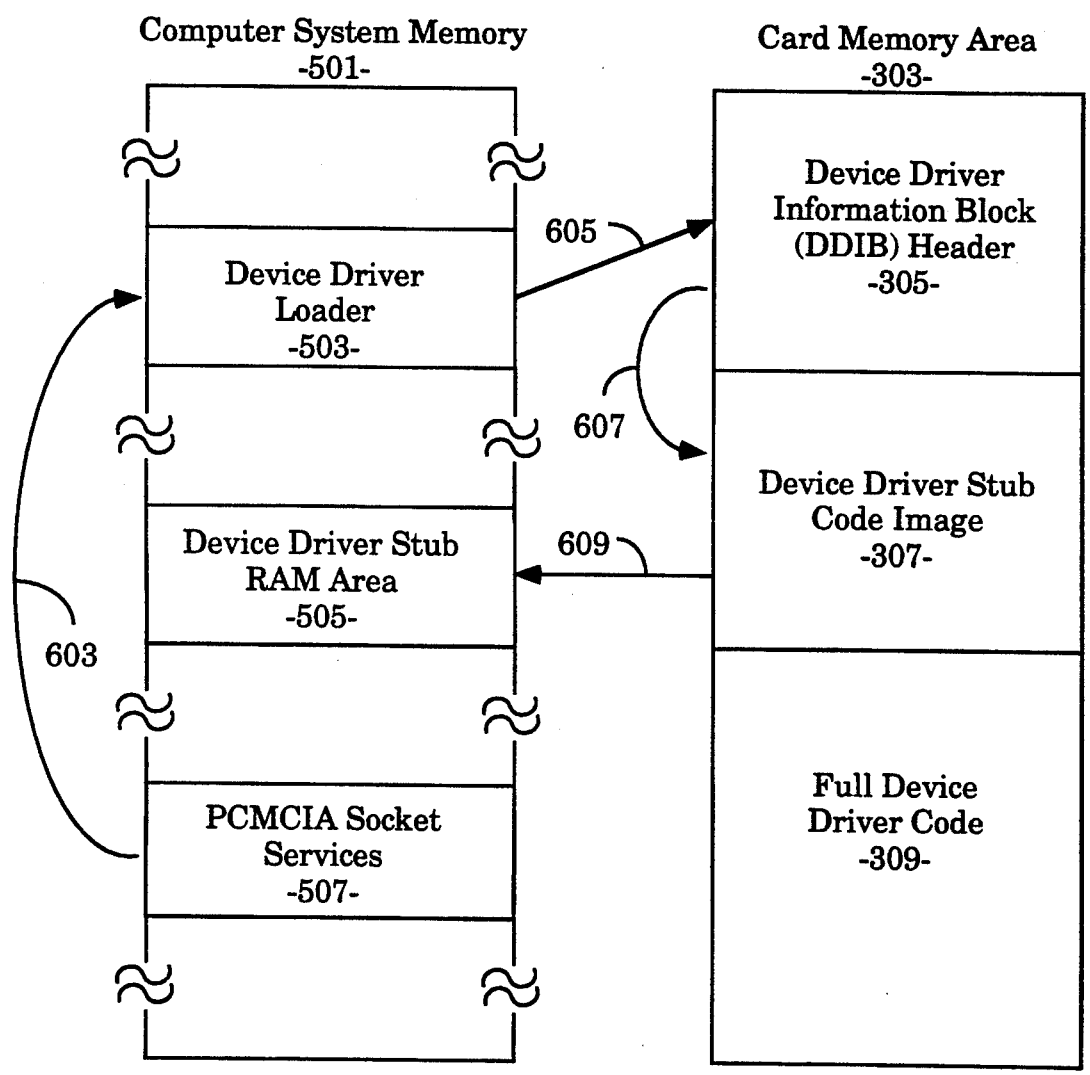
FIG. 5 illustrates the content of computer system memory as related to the content of the feature card memory.

Referring now to FIG. 5, a portion of computer system memory 501 residing within random access memory 102 is illustrated. Computer system memory portion 501 comprises device driver loader 503, device driver stub RAM area 505, and PCMCIA socket services 507. Device driver loader 503 comprises processing logic for loading and dispatching the approriate device driver on initialization of the computer system and when a card is inserted or removed (i.e. a card insertion or removal event) from the computer system. The details of the processing performed by the device driver loader 503 of the preferred embodiment is described in more detail in connection with the flow charts of FIGS. 7 and 8. Device driver stub RAM area 505 comprises a memory area used for the storage of device driver stubs that are either loaded during computer system initialization time or loaded upon the insertion of a card into the computer system. The content of device driver stub RAM area 505 is described in more detail in connection with FIGS. 6a and 6b. PCMCIA socket services 507 comprises processing logic for handling low level control of card insertion and removal events. Processing logic within PCMCIA socket services 507 receives interrupts upon the detection of a card insertion or removal event. Processing logic corresponding to the function carried out by PCMCIA socket services 507 is well known to those of ordinary skill in the art.

Also illustrated in FIG. 5 is card memory area 303 as described above in connection with FIG. 3. Card memory area 303 comprises device driver information block (DDIB) header 305, device driver stub code image 307, and full device driver code 309.

Upon a card insertion event, PCMCIA socket services 507 receives and interrupt and initially responds to the card event. PCMCIA socket services 507 activates device driver loader 503 as indicated by line 603 in FIG. 5. Upon activation of device driver loader 503, PCMCIA socket services 507 provides device driver loader 503 with an identification of the socket adapter and socket for which the card event interrupt was received. Device driver loader 503 then accesses the device driver information block (DDIB) header 305 on the newly inserted card as indicated by line 605. By accessing DDIB header 305, device driver loader 503 gains access to the card information described above in connection with FIG. 4. Specifically, device driver loader 503 may read the device driver stub unique identification 407, device driver stub code offset 421, device driver stub code length 423, device driver stub data offset 425, and device driver stub data length 427. Using this information, device driver loader 503 determines where in card memory area 303 the device driver stub code image 307 resides. Once the location and size of device driver stub code image 307 is determined as indicated by line 607, device driver loader 503 copies the contents of device driver stub code image 307 from card memory area 303 into a portion of device driver stub RAM area 505 as indicated by line 609 in FIG. 5. The device driver stub code image 307 is written into device driver stub RAM area 505 and linked into a linked list of device driver stubs maintained by device driver loader 503. The manner in which the device driver stubs are linked by device driver loader 503 is described in connection with FIGS. 6a and 6b.

Figure 6A:
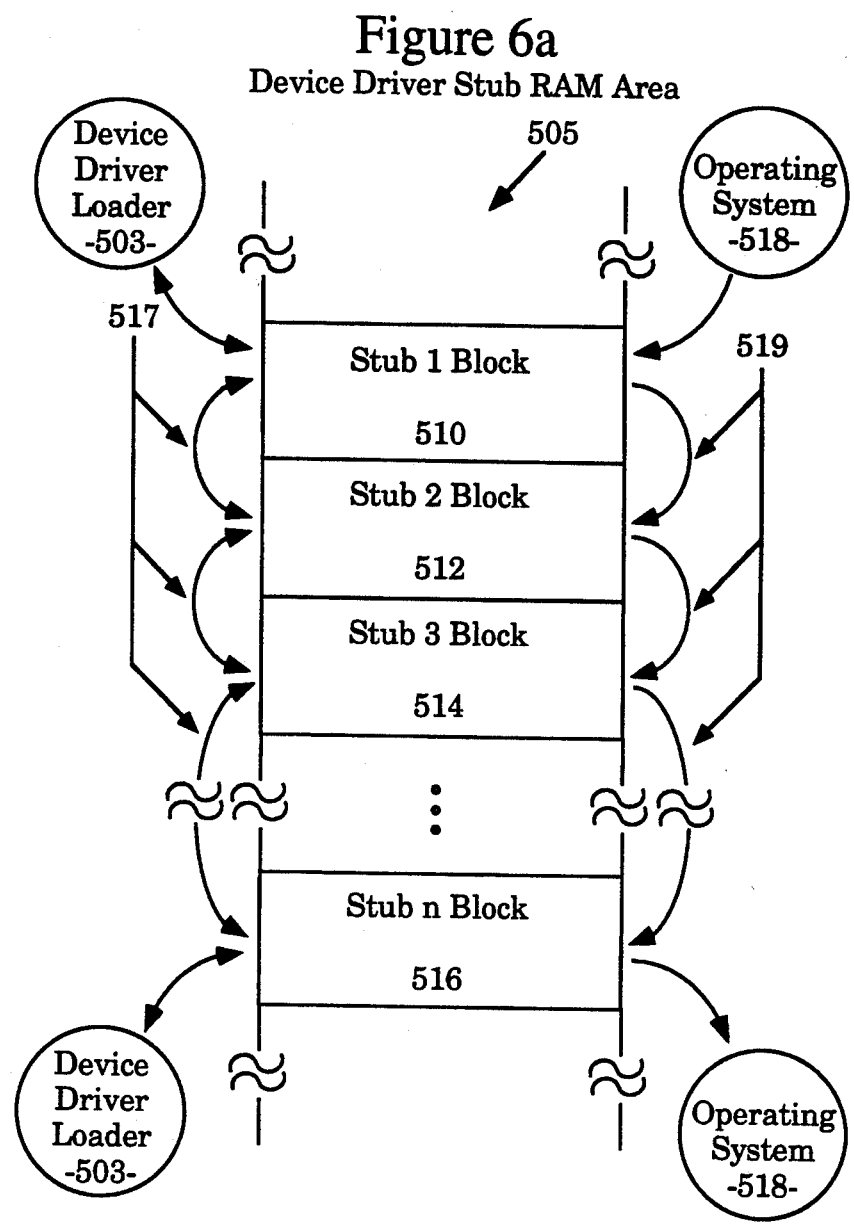
FIG. 6a illustrates the content of the Device Driver Stub RAM Area.

Referring now to FIG. 6a, the device driver stub RAM area 505 is illustrated. Device driver stub RAM area 505 comprises memory storage area for a plurality of device driver stub blocks. By way of example, FIG. 6a illustrates stub 1 block 510, stub 2 block 512, stub 3 block 514, and stub n block 516. It will be apparent to those skilled in the art that any number of device driver stub blocks from zero to n may reside within device driver stub RAM area 505. It will be also apparent to those skilled in the art that the number of stub blocks within device driver stub RAM area 505 dynamically changes throughout the usage of the computer system. Thus, the device driver stubs do not need to be fixed in memory at bootstrap initialization time. It should also be noted that the relative size or number of memory locations required by each device driver stub block is relatively small in comparison to the full device driver code for controlling feature card functionality. The relatively small size of each device driver stub block provides the opportunity to store a large number of different device driver stubs within device driver stub RAM area 505.

Figure 6B:
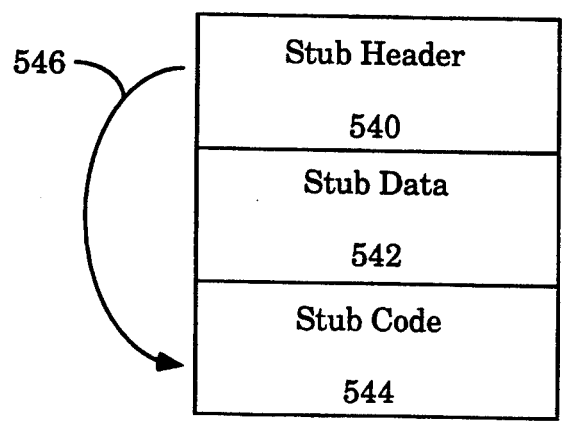
FIG. 6b illustrates the content of a stub block.

The device driver stub blocks within device driver stub RAM area 505 are each composed of three components. Referring now to FIG. 6b, the three components of each stub block of device driver stub RAM area 505 is illustrated. Each stub block comprises a stub header 540, stub data 542, and stub code 544. Stub header 540 is used mainly by operating system logic that controls the operation of the computer system.

Referring now to FIG. 6c, the content of stub header 540 for each stub block is illustrated. Stub header 540 comprises device driver linkage information 630, device driver attribute information 632, device driver strategy offset 634, device driver interrupt offset 636, and device driver units and name 638. The computer system memory 102 resident device driver information 630, 632, 634, 636, and 638 of the stub header 540 corresponds to the device driver information 411, 413, 415, 417, and 419 of the card resident DDIB header. The DDIB device driver information is transferred to the stub header 540 when a stub device driver is loaded.

Device driver linkage information 630, device driver attribute information 632, and device driver units and name 638 comprise device driver identification and linking information used by the operating system to identify and link with the corresponding device driver. Device driver linkage information 630 is used by the operating system to create a forward linked list of device drivers as illustrated by lines 519 in FIG. 6a. Using the device driver linkage information 630, the operating system 518 may access each device driver in the linked list by traversing down the list using the device driver linkage information of each device driver stub block until the last device driver stub block points back to the operating system 518. Stub header 540 also includes a device driver strategy offset 634 and a device driver interrupt offset 636 which are used to identify the entry point to stub code 544 as illustrated by line 546 in FIG. 6b.

Referring now to FIG. 6d, the content of stub data 542 is illustrated. Stub data 542 comprises pointers 660 and 662 that are used by device driver loader 503 for creating a forward and backward linked list of device driver stub blocks within device driver stub RAM area 505. Pointer 660 is a pointer to the previous device driver stub block in the linked list. Pointer 662 is a pointer to the next device driver stub block in the linked list. This doubly linked list structure is illustrated in FIG. 6a by lines 517.

Referring to FIG. 6a, device driver loader 503 contains a pointer to the first device driver stub block 510 in the linked list. The pointer 662 of stub 1 block 510 points to stub 2 block 512. Similarly, pointer 660 of stub 1 block 510 points back to device driver loader 503. In a similar manner, pointers 660 and 662 of each device driver stub block is used to point to the previous and next device driver stub in the linked list. Thus, the device driver stubs are forward and backward linked in a linked list. The last device driver stub block in the linked list (i.e., stub n block 516), points back to device driver loader 503 to complete the doubly linked list.

Referring again to FIG. 6d, stub data 542 also comprises an adapter identification 664 and a socket identification 666. Adapter identification 664 and socket identification 666 uniquely identify the computer system hardware interface with which the device driver stub is associated. Device driver stub unique identification 668, which is the same identification as the feature card resident device driver stub unique identification 407 illustrated in FIG. 4, uniquely identifies the device driver stub associated with the feature card. Card insertion flag 672 is used to retain an indication of whether the card associated with the device driver stub is inserted or removed. Driver specific data area 674 is a memory area allocated for use by the device driver stub for storage of its own data.

Referring now to FIGS. 7 through 13, flowcharts illustrating the processing logic used by the preferred embodiment are illustrated. It will be apparent to those skilled in the art that the processing logic described herein may be executed by processor 101 of the computer system.

Figure 7:
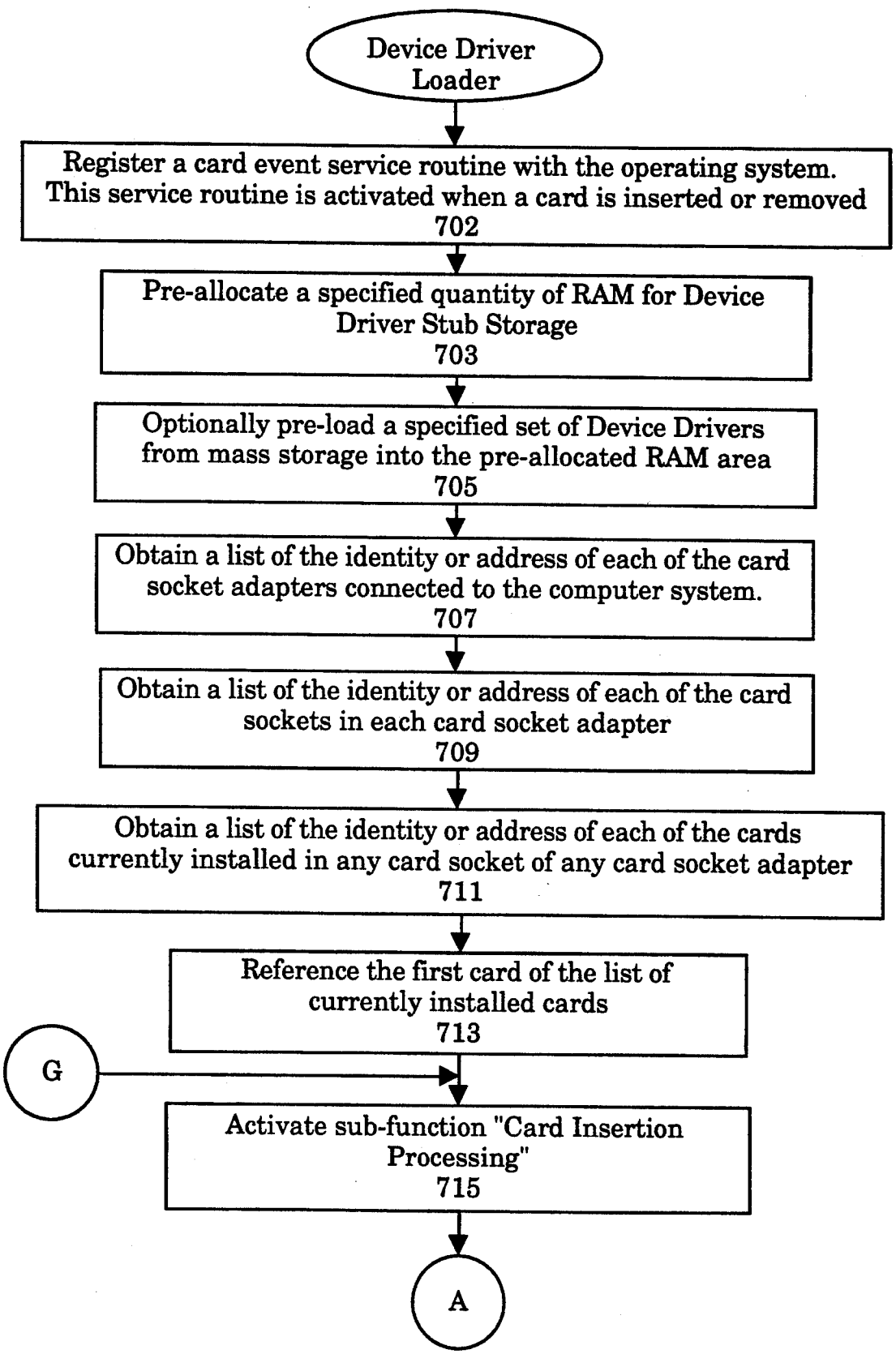
FIGS. 7-13 are flow charts illustrating the processing logic of the preferred embodiment.

Referring now to FIG. 7, the processing logic associated with the device driver loader 701 is illustrated. Device driver loader logic 701 corresponds to device driver loader 503 illustrated in FIGS. 5 and 6a. Processing logic starting at bubble 701 may be activated by the operating system at bootstrap initialization of the computer system. Upon activation of the device driver loader, a card event service routine is registered with the operating system in processing block 702. Means for registering a service routine with the operating system is well-known in the art. This card event service routine is activated upon a card insertion or removal event. Device driver stub RAM area 505 is allocated in processing block 703. A predetermined quantity of random access memory 102 is allocated for the storage of device driver stubs in device driver stub RAM area 505. A set of commonly used device drivers may optionally be preloaded into the device driver stub RAM area 505 during initialization time in processing block 705. These initially loaded device drivers may be stored on a mass storage device and transferred from there into device driver stub RAM area 505. Next, the hardware interfaces are queried to determine the identity and address of card socket adapters that are connected and available for use within the computer system. In an alternative embodiment, a predetermined list of card socket adapters may be provided and obtained by the device driver loader in processing block 707. In a similar manner, the address or identity of each of the card sockets within each card socket adapter is determined in processing block 709. If any feature cards are currently installed in any of the available sockets of the computer system, the identity or address of the installed cards is obtained in processing block 711. The device driver loader now has a list of card socket adapters, a list of card sockets, and a list of currently installed feature cards. An index parameter is initialized to point to the first of the currently installed cards in the list of installed cards in processing block 713. A subfunction called "Card Insertion Processing" is then activated in processing block 715 to install the device driver stub for the currently indexed card. Device driver loader processing continues at the bubble labelled A as illustrated in FIG. 8.

Figure 8:
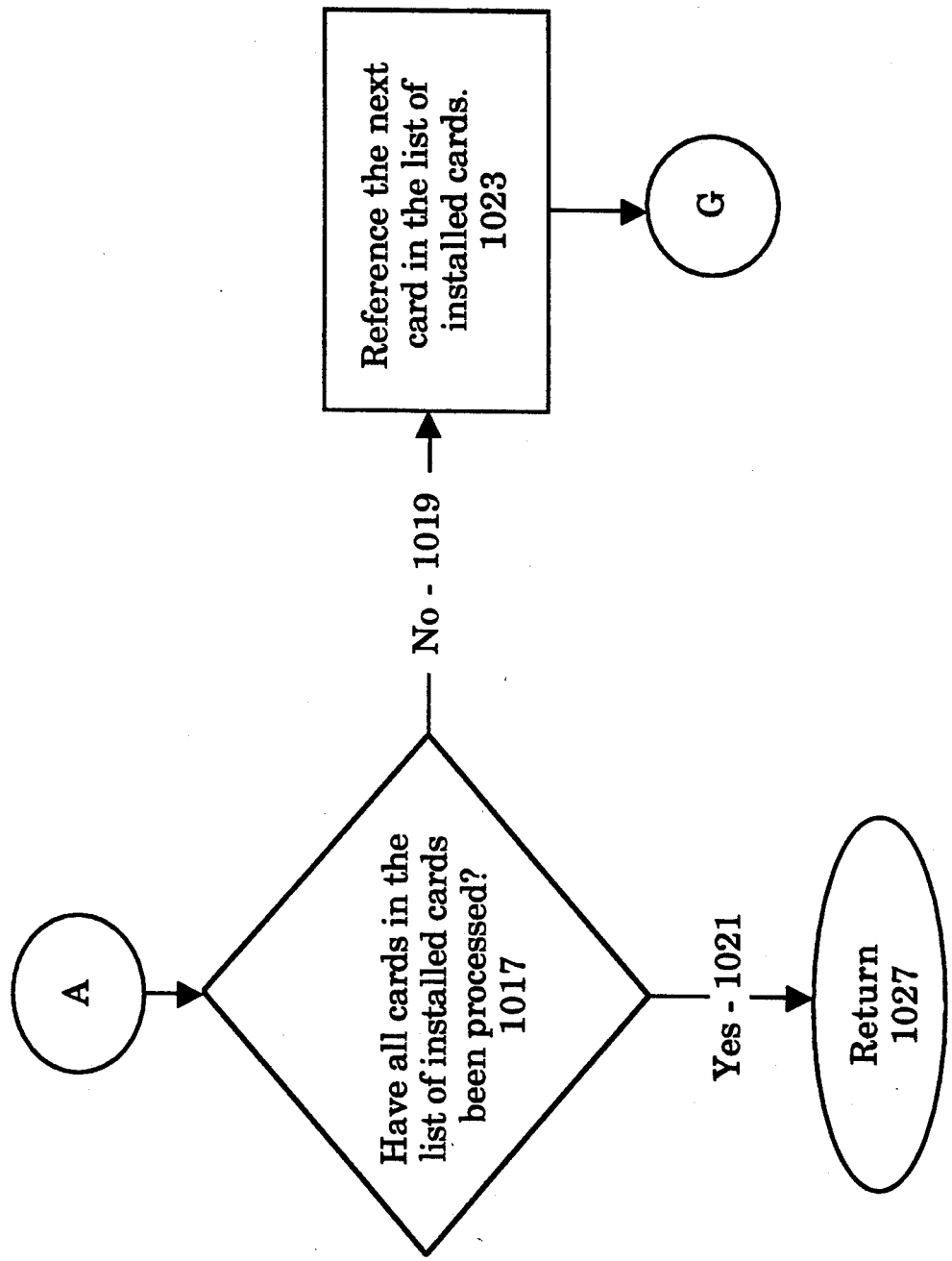

Referring now to FIG. 8, the processing for the device driver loader continues at the bubble labeled A. As the list of currently installed cards is processed, decision block 1017 is executed to determine if all cards have been processed. Once all of the cards in the list of installed cards have been processed, processing path 1021 is taken to termination bubble 1027 where processing for the device driver loader terminates. If each of the installed cards in the list of installed cards have not yet been processed, processing path 1019 is taken to processing block 1023 where the index into the list of installed cards is advanced to point to the next installed card and processing continues at the bubble labelled G as illustrated in FIG. 7. At the bubble labelled G, the card insertion processing subfunction is again activated for the newly indexed installed card.

Figure 9:
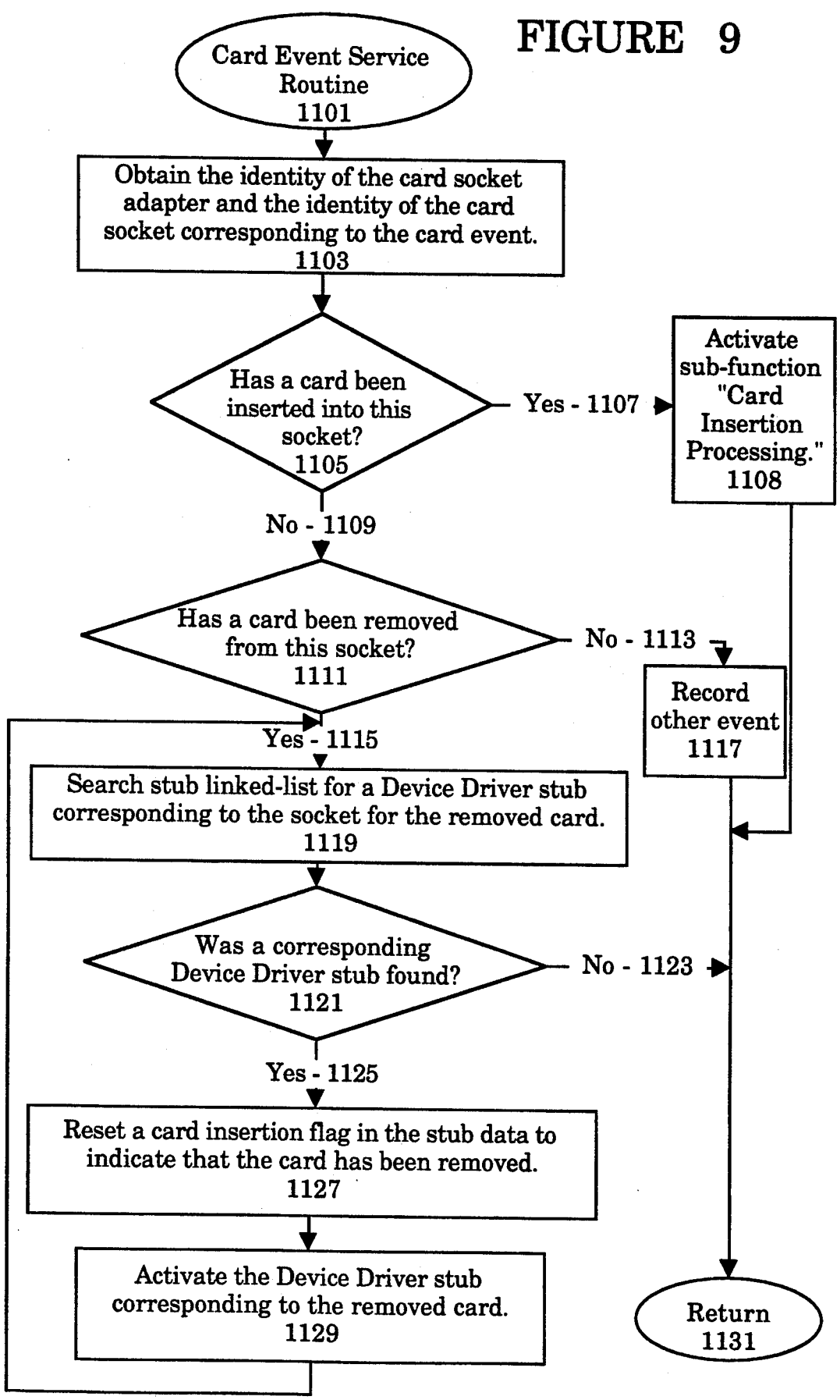

Referring now to FIG. 9, the processing for a card event service routine 1101 is illustrated. Card event service routine 1101 is a software routine registered with the operating system at bootstrap initialization of the computer system. Card event service routine 1101 is activated when a hardware event is detected by the computer system upon the insertion or removal of a feature card in any socket provided by the computer system. Upon activation of card event service routine 1101, the identity of the card socket adapter and the card socket corresponding to the hardware event is obtained in processing block 1103. If a card insertion event is detected, processing path 1107 is taken to processing block 1108 where the card insertion processing subfunction is activated for the newly installed card. Processing then terminates at return bubble 1131.

Referring again to decision block 1105, if a card has not been inserted into a socket, processing path 1109 is taken to decision block 1111. If a card removal event is detected, processing path 1115 is taken to processing block 1119 where the linked list of device driver stubs within device driver stub RAM area 505 is traversed in search of a device driver stub corresponding to the socket for the removed card. If a device driver stub corresponding to the removed card is found, processing path 1125 is taken to processing block 1127 where a card insertion flag in the stub data is reset to indicate that the corresponding card has been removed. Once the card insertion flag for the removed card has been reset, the device driver stub corresponding to the removed card is activated in processing block 1129. Activation of the device driver stub corresponding to the removed card causes the device driver stub to gracefully terminate any ongoing activity while the card was installed and disables further access to the removed card. The device driver stub is then unlinked from the linked list of device driver stubs. Upon completion of processing block 1129, control is transferred back to processing block 1119 where the stub linked list is again traversed for another device driver stub corresponding to the socket for which a card removal event was detected. The loop between processing blocks 1119 and 1129 continues for each device driver stub in the linked list until every device driver stub of the removed card is processed. When this occurs, processing path 1123 is taken to bubble 1131 where processing for card event servicing terminates.

Referring back to decision block 1111, if the hardware event causing the activation of card event service routine 1101, is neither a card insertion event nor a card removal event, processing path 1113 is taken to processing block 1117 where the unidentified event is recorded. Processing then terminates at bubble 1131.

Figure 10:
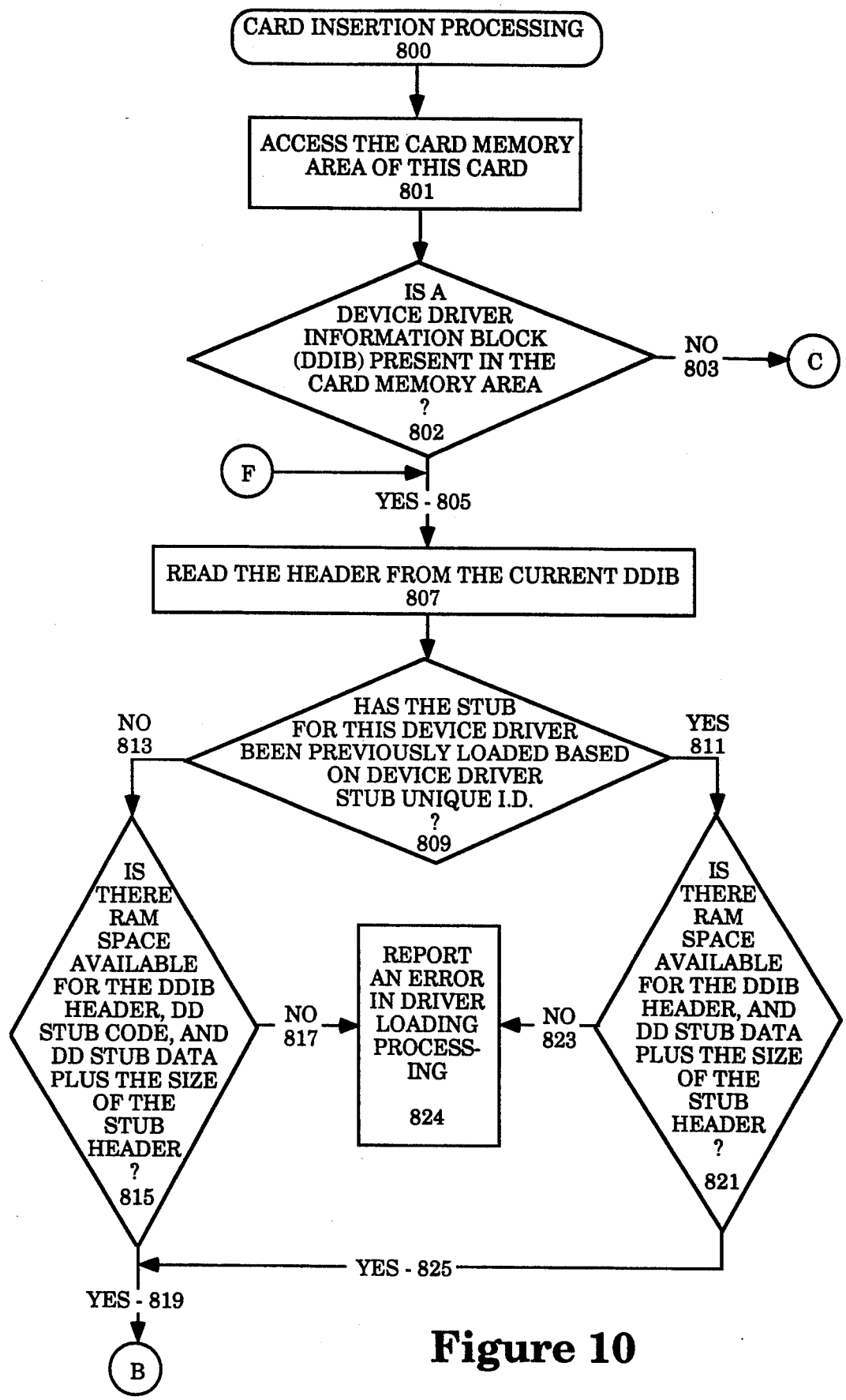

Referring now to FIG. 10, the card insertion processing subfunction 800 is illustrated. Card insertion processing 800 is activated either from processing block 715 illustrated in FIG. 7 or processing block 1108 illustrated in FIG. 9. Card insertion processing 800 is responsible for controlling the allocation and loading of a device driver stub corresponding to a newly inserted feature card. Starting at processing block 801, the card memory area of the newly inserted card is accessed. If a device driver information block (DDIB) is present in the card memory area of the newly installed card, processing path 805 is taken to processing block 807. If no DDIB is present in the card memory area, processing path 803 is taken to the bubble labelled C illustrated in FIG. 12 where card insertion processing terminates at bubble 1017. Because not all feature cards require a device driver, processing path 803 is provided for those cards that do not require a device driver.

Figure 11:
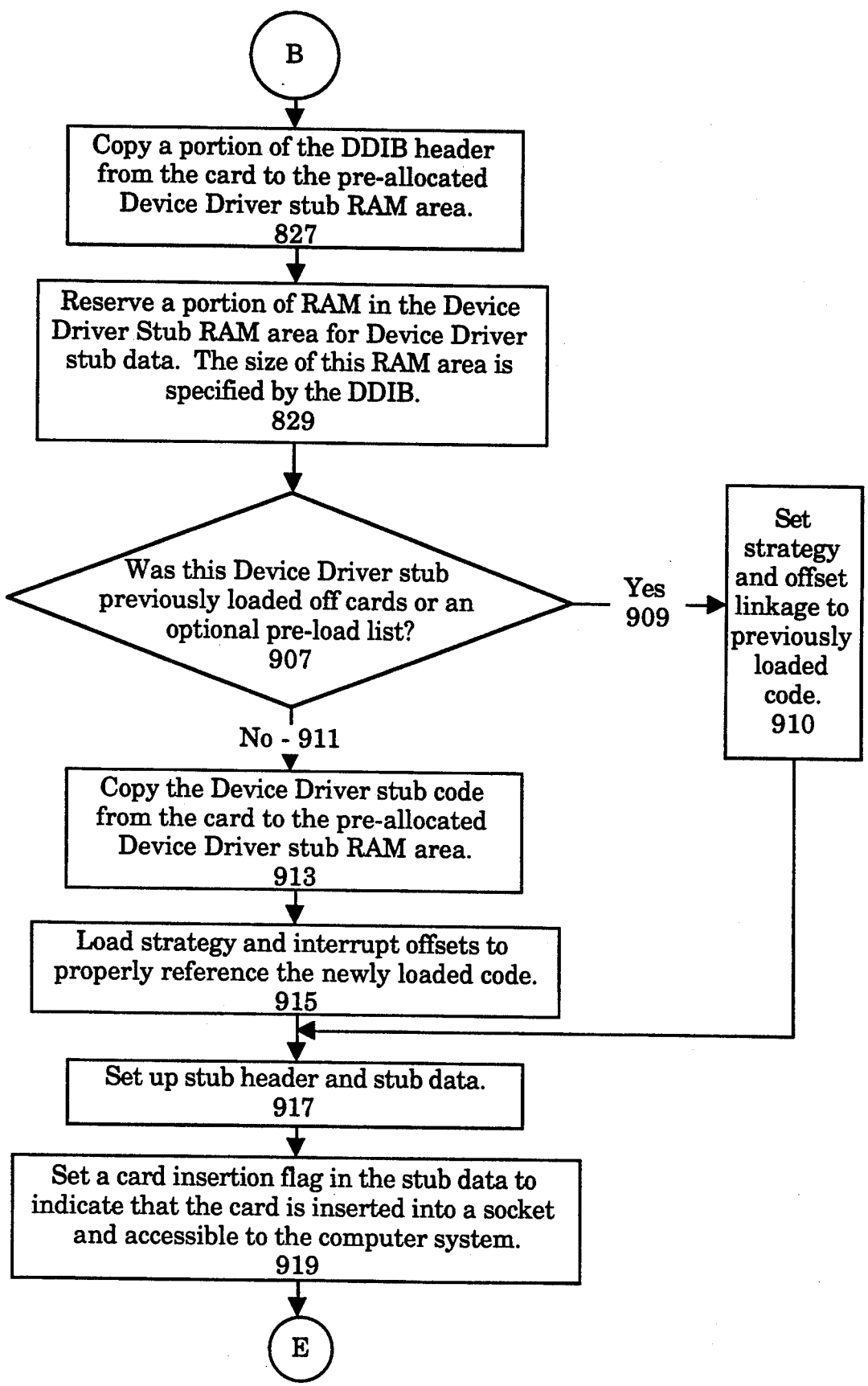
Figure 12:
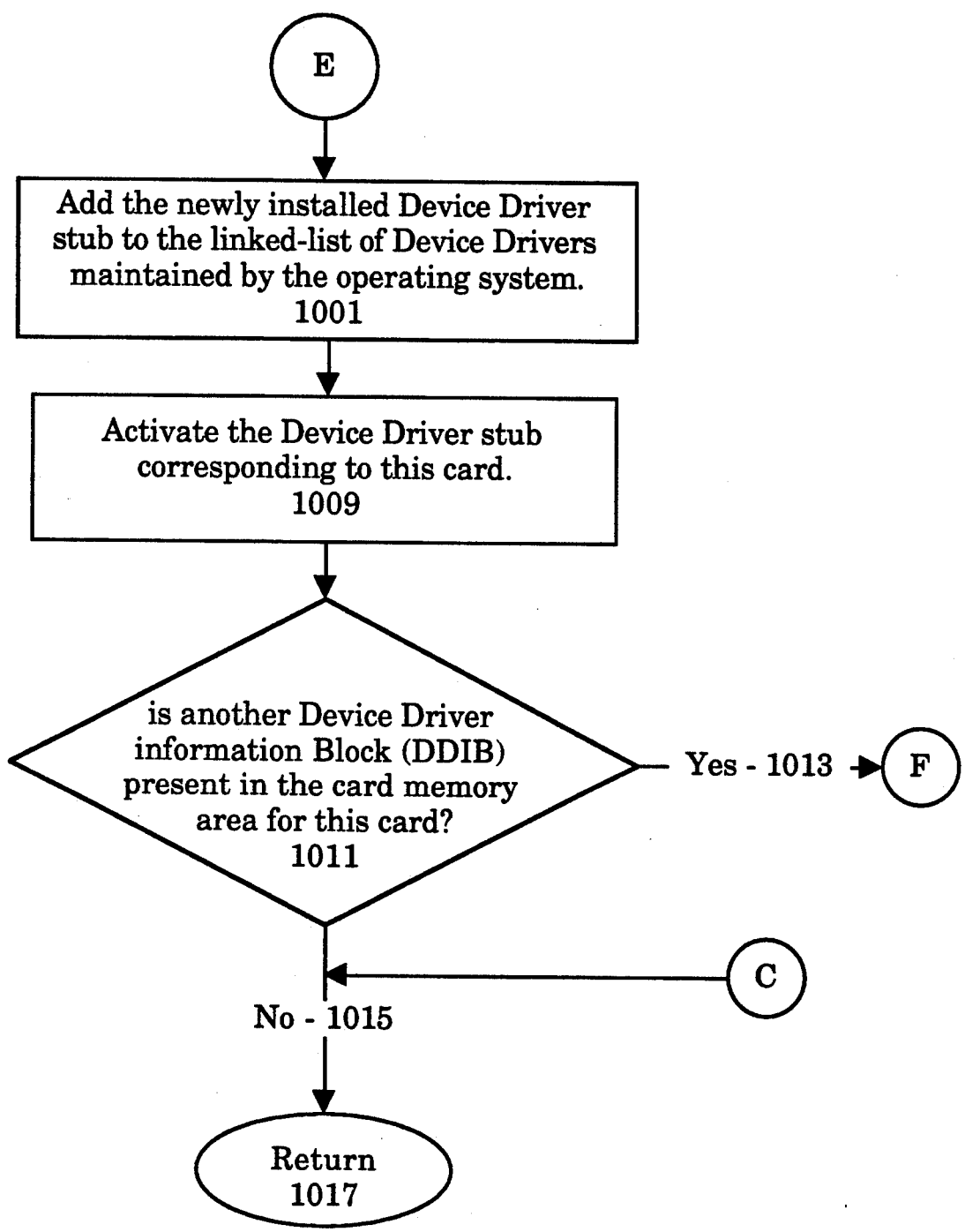

At processing block 807, the header of the DDIB of the newly installed card is read. Decision block 809 tests whether or not the device driver stub for the newly installed card has been previously loaded based on the device driver stub unique identification. If this device driver stub has been previously loaded, the device driver stub executable code does not need to be loaded again. Thus, if the stub has already been previously loaded, processing path 811 is taken to decision block 821 where available space within device driver stub RAM area 505 is checked. If there is available RAM space for the device driver stub data and the stub header, processing path 825 is taken to the bubble labelled B as illustrated in FIG. 11. If, in decision block 821, there is not enough RAM space available, processing path 823 is taken to processing block 824 where an error in driver loading processing is reported. Card insertion processing then terminates through the bubble labelled C as illustrated in FIG. 12.

Referring again to decision block 809, if the device driver stub for the newly installed feature card has not been previously loaded, processing path 813 is taken to decision block 815 where a test is made to determine if there is enough space in device driver stub RAM area 505 for the storage of the device driver stub executable code, the device driver stub data, and the stub header. If there is enough RAM space available, processing path 819 is taken to the bubble labelled B as illustrated in FIG. 11. If, however, there is not enough RAM space available as a result of the test made in decision block 815, processing path 817 is taken to processing block 824 where an error in device driver loading processing is reported and processing terminates through the bubble labelled C as illustrated in FIG. 12.

Referring now to FIG. 11, card insertion processing continues at the bubble labelled B. At this point, it has been determined that sufficient space is available in device driver stub RAM area 505 for the storage of the device driver stub for the newly inserted feature card. In processing block 827, a portion of the DDIB header from the newly installed card is copied into the preallocated device driver stub RAM area. In particular, fields 411, 413, 415, 417, and 419 of the DDIB header are copied into fields 630, 632, 634, 636, and 638 of the stub header, respectively. An additional portion of RAM in the device driver stub RAM area is reserved for device driver stub data in processing block 829. The size of this stub data area is specified by a parameter 427 in the DDIB header. If the device driver stub was not previously loaded from a feature card or a list of preloaded device driver stubs loaded during bootstrap initialization of the computer system, processing path 911 is taken to processing block 913. In processing block 913, the device driver stub executable code is copied from the newly installed feature card to the preallocated device driver stub RAM area within device driver stub RAM area 505. The strategy and interrupt offsets are loaded in processing block 915 to properly reference the newly loaded code. Referring back to decision block 907, if the device driver stub was previously loaded from a prior feature card or an optional initialization preload list, processing path 909 is taken to processing block 910 where the strategy and offset linkage is set to the previously loaded executable code. In this manner, loading a previously loaded device driver stub may be prevented. Processing then continues at processing block 917.

At processing block 917, the stub header area and stub data area within device driver stub RAM area 505 is initialized. Initialization of these areas includes loading linkage pointers, adapter and socket identification information, and the device driver stub unique identification. These areas may be loaded by transferring the corresponding information from the card resident DDIB header. A card insertion flag in the stub data is set in processing block 919 to indicate that the card is inserted into a socket and accessible to the computer system. Processing then continues at the bubble labelled E as illustrated in FIG. 12.

Referring now to FIG. 12, the newly installed device driver stub is added to the linked list of device drivers maintained by the operating system in processing block 1001. Adding the newly installed device driver stub to this linked list involves setting a pointer in the stub header to point to the next device driver block in the linked list. Similarly, the stub header pointer of the previous device driver block is set to point to the newly installed device driver stub. The device driver stub corresponding to the newly inserted card is activated in processing block 1009. As a result of the activation of the device driver stub, the device driver stub enables the activation of the full device driver code 309 resident on the newly installed card. Activation of the full card resident device driver code 309 is enabled and memory mapping to the newly installed card is allowed. Thus, the device driver stub provides a linkage between the computer system software and the card resident device driver and the card resident functionality.

If another device driver information block is present in the card memory area for the newly installed card, processing path 1013 is taken to the bubble labelled F as illustrated in FIG. 10 where the header for the subsequent device driver information block is read in processing block 807. Because feature cards may contain more than one set of functionality, more than one device driver per card may be present. If, however, no other device driver information block is present for the newly installed card, processing path 1015 is taken to termination bubble 1017 where card insertion processing terminates.

Figure 13:
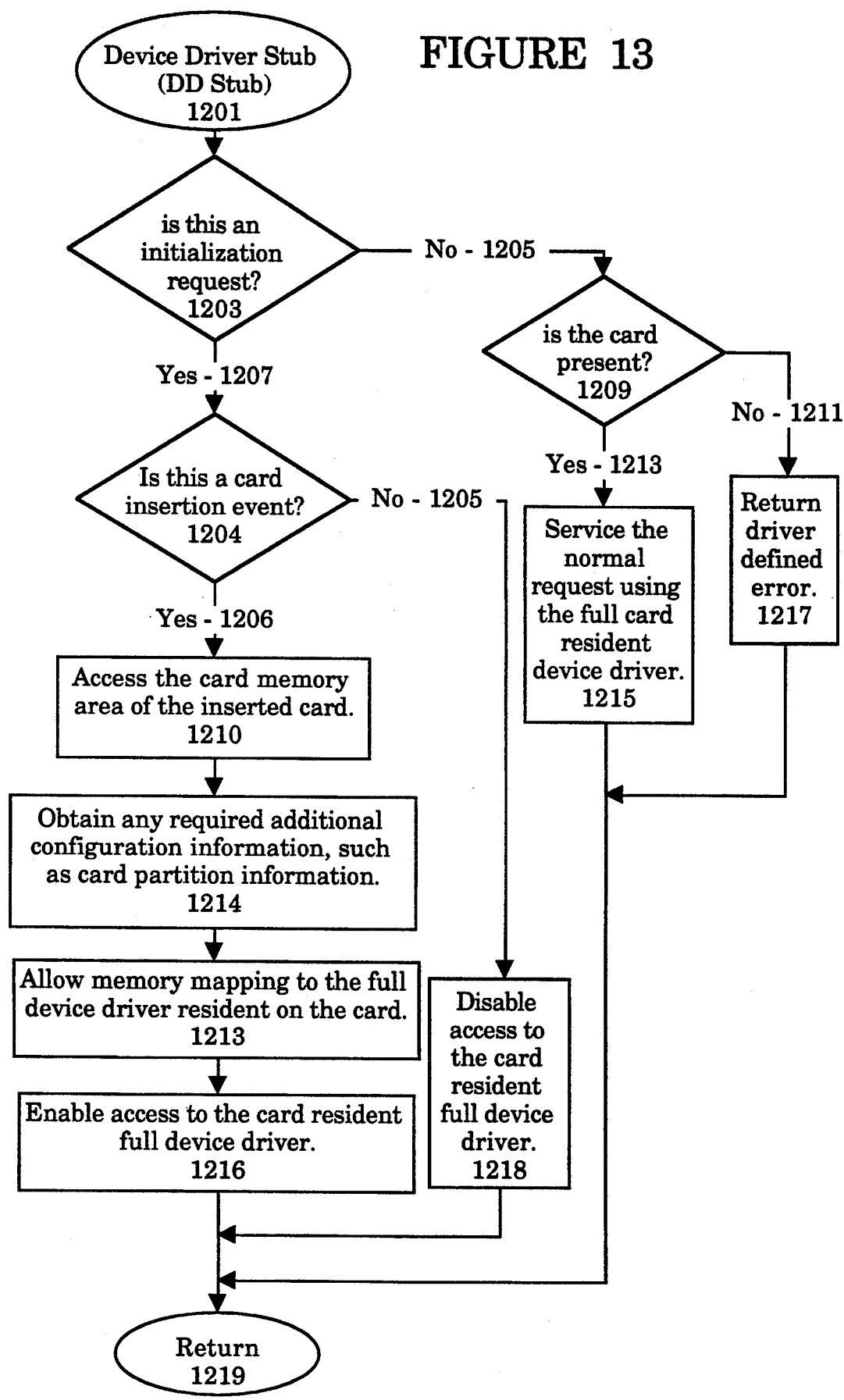

Referring now to FIG. 13, the processing logic for each device driver stub is illustrated starting at bubble 1201. The device driver stub processing logic is activated in response to a card insertion or removal event. For example, device driver stub processing logic is executed in response to the activation of the device driver stub logic in processing block 1129 illustrated in FIG. 9 and in processing block 1009 illustrated in FIG. 12.

If the device driver stub is being activated in order to initialize the operation of the device driver stub after being loaded, processing path 1207 is taken to decision block 1204. If the activation of the device driver stub is the result of a card insertion event, processing path 1206 is taken to processing block 1210 where the card memory area of the inserted card is accessed. Any necessary configuration or card partition information is obtained by the device driver stub in processing block 1214. Mapping to the full device driver resident on the feature card is enabled in processing block 1213. Access to the card resident full device driver is enabled in processing block 1216. As a result of enabling access to the card resident full device driver, processing control may subsequently be transferred to the full card resident device driver where feature card functionality may be fully exploited. By executing the card resident full device driver, the full device driver executable code does not need to be transferred to computer system random access memory for execution therein.

Referring again to decision block 1204, if the device driver stub is not activated in response to a card insertion event, a card removal event is assumed. In this case, processing path 1205 is taken to processing block 1218 where access to the card resident full device driver is disabled in response to the removal of the card. In this manner, computer system software is prevented from inadvertently attempting to access a removed card.

Referring back to decision block 1203, if the device driver stub is not activated for the purpose of initializing the device driver stub, processing path 1205 is taken to decision block 1209. Processing path 1205 is taken during the normal operation of the device driver stub after initialization has occurred. In this case, the presence of the card corresponding to the device driver stub is checked in processing block 1209. If the card has been removed, processing path 1211 is taken to processing block 1217 where a device driver defined error is returned and processing terminates at bubble 1219. If, however, the card corresponding to the device driver stub is still present and active, processing path 1213 is taken to processing block 1215 where a normal device driver request is serviced by the full card resident device driver. Upon completion of the normal request in processing block 1215, processing terminates at bubble 1219.

Thus, a computer system having a method and means for dynamically configuring device drivers of system resources is described.

Although the invention is described herein with reference to a specific embodiment, many modifications and variations therein will readily occur to those skilled in the art. Accordingly, all such variations and modifications are included within the intended scope of the present invention as defined by the following claims.

What is claimed is:

1. In a computer system having a processor, a system memory, and an interface for receiving a removable system resource, a process for dynamically configuring device drivers of removable computer system resources, said process comprising the steps of:
   providing a resource memory in a removable system resource;
   loading a device driver into said resource memory, said device driver for controlling said removable system resource;
   loading a device driver stub into said resource memory, said device driver stub for enabling said device driver;
   receiving an indication that said removable system resource has been coupled to said interface subsequent to initialization of said processor;

copying said device driver stub into said system memory;

executing said device driver stub from said system memory;

enabling access to said device driver, said access being enabled by said device driver stub, said enabling step further including the step of allowing memory mapping to said device driver residing in said resource memory; and executing said device driver from said resource memory.

2. The process as claimed in claim 1 wherein said resource memory further includes a device driver information block (DDIB) header, said process further including the step of copying said DDIB header into said system memory.

3. The process as claimed in claim 2 wherein said DDIB header includes link data and a device stub unique identification, said process further including the step of linking said device driver stub with a different device driver stub stored in system memory.

4. The process as claimed in claim 3 wherein said step of linking said device driver stub further including the steps of forward linking said device driver stub with a succeeding device driver stub and backward linking said device driver stub with a preceding device driver stub, said succeeding and said preceding device driver stub residing in system memory.

5. The process as claimed in claim 1 further including the steps of:
determining whether said device driver stub already resides in said system memory; and
preventing said copying if said device driver stub already resides in said system memory.

6. The process as claimed in claim 1 further including the steps of:
receiving an indication that a removable system resource has been decoupled from said interface; and
disabling access to said device driver, said access being enabled by said device driver stub.

7. The process as claimed in claim 6 wherein said DDIB header includes link data and a device driver stub unique identification, said process further including the step of unlinking said device driver stub from different device driver stub stored in said system memory.

8. In a computer system having a processor, a system memory, and an interface for receiving a removable system resource, a device for dynamically configuring device drivers of removable computer system resources, said device comprising:
a resource memory in said removable system resource, said resource memory comprising a device driver for controlling said removable system resource, said resource memory further including a device driver stub for enabling said device driver;
means for receiving an indication that said removable system resource has been coupled to said interface subsequent to initialization of said processor;
means for copying said device driver stub into said system memory;
means for executing said device driver stub from said system memory;
means for enabling access to said device driver, said access being enabled by said device driver stub, said means for enabling access to said device driver further including means for allowing memory mapping to said device driver residing in said resource memory; and means for executing said device driver from said resource memory.

9. The device as claimed in claim 8 wherein said resource memory further includes a device driver information block (DDIB) header, said device further including the means for copying said DDIB header into said system memory.

10. The process as claimed in claim 9 wherein said DDIB header includes link data and a device driver stub unique identification, said device further including the means for linking said device driver stub with different device driver stub stored in said system memory.

11. The device as claimed in claim 10 wherein said means for linking said device driver stub further including means for forward linking said device driver stub with a succeeding device driver stub and means for backward linking said device driver stub with a preceding device driver stub, said succeeding and said preceding device driver stubs residing in system memory.

12. The device as claimed in claim 8 further including:
means for determining whether said device driver stub already resides in said system memory; and
means for preventing said copying step if said device driver stub already resides in said system memory.

13. In a computer system having a processor, a system memory, and an interface for receiving a removable system resource, a device for dynamically configuring device drivers of removable computer system resources, said device comprising:
a resource memory in said removable system resource, said resource memory comprising a device driver for controlling said removable system resource, said resource memory further including a device driver stub for enabling said device driver;
a card insertion flag in said system memory;
means for setting said card insertion flag when said removable system resource is coupled to said interface;
means for receiving an indication that said removable system resource has been coupled to said interface subsequent to initialization of said processor;
means for copying said device driver stub into said system memory;
means for executing said device driver stub from said system memory;
means for enabling access to said device driver, said access being enabled by said device driver stub; and
means for executing said device driver from said resource memory.

14. The device as claimed in claim 13 further including:
means for resetting said card insertion flag when said removable system resource has been decoupled from said interface; and
means for disabling access to said device driver in response to said reset card insertion flag.

15. The device as claimed in claim 14 wherein said DDIB header includes link data and a device driver stub unique identification, said device further including the means for unlinking said device driver stub from different device driver stub stored in said system memory.

16. In a computer system having a processor, a system memory, and an interface for receiving a removable system resource, a process for dynamically configuring device drivers of removable computer system resources, said process comprising the steps of:

providing a resource memory in a removable system resource;

loading a device driver into said resource memory, said device driver for controlling said removable system resource;

loading a device driver stub into said resource memory, said device driver stub for enabling said device driver;

providing a card insertion flag in said system memory;

setting said card insertion flag when said removable system resource is coupled to said interface;

receiving an indication that said card insertion flag has been set, said removable system resource having been coupled to said interface subsequent to initialization of said processor;

copying said device driver stub into said system memory;

executing said device driver stub from said system memory;

enabling access to said device driver, said access being enabled by said device driver stub; and executing said device driver from said resource memory.

17. The process as claimed in claim 16, further comprising the steps of:

resetting said card insertion flag when said removable system resource is decoupled from said interface; and in response to said resetting, disabling access to said device driver.

* * * * *